Nov. 24, 1970 A. H. YOUMANS 3,541,851
METHOD OF LOCATING THE STUCK POINT OF A PIPE IN A WELL
Filed May 22, 1968 2 Sheets-Sheet 1

INVENTOR.
ARTHUR H. YOUMANS
BY William E. Johnson Jr.
ATTORNEY

INVENTOR.
ARTHUR H. YOUMANS

United States Patent Office 3,541,851
Patented Nov. 24, 1970

1

3,541,851
METHOD OF LOCATING THE STUCK POINT OF A PIPE IN A WELL
Arthur H. Youmans, Houston, Tex., assignor to Dresser Industries, Inc., Dallas, Tex., a corporation of Delaware
Filed May 22, 1968, Ser. No. 731,238
Int. Cl. E21b 47/00
U.S. Cl. 73—151                                  2 Claims

ABSTRACT OF THE DISCLOSURE

The stuck pipe is mechanically worked, as by applying a torque or stretch, while making a temperature log along the length of the pipe. Depending upon the type of sticking, the temperature log provides an appropriate indication of the stuck point. In one of the preferred embodiments of the invention, the pipe receives a cyclically applied torque at a relatively high frequency to provide heating of the pipe while avoiding excessive stressing of the pipe material.

BACKGROUND OF THE INVENTION

This invention relates to methods for determining the point or points at which drill pipe, casing, tubing or the like is stuck in a well.

Although there are various reasons for determining the location at which a pipe is stuck, the principal reasons concern the removing of the free pipe above the stuck point or to perform various operations at the stuck point with or without removal of the pipe. For convenience throughout this specification, the term "pipe" is used hereinafter to include casing, tubing, drill pipe and the like.

It is therefore an object of this invention to provide a method of determining the point in a well at which pipe is stuck which gives a positive indication of the depth of the stuck point.

It is a further object of this invention to provide a method of determining the point at which a pipe is stuck in a well, while preventing excessive stress upon the pipe.

The objects of the invention are accomplished, broadly, by a method which includes the twisting of the pipe to cause heating of the pipe at one or more points and which also includes measuring the temperature of the pipe along those points to indicate the stuck point. These and other objects, features and advantages of the invention will become readily apparent when the following description is considered in connection with the accompanying drawing in which.

Figure 4:
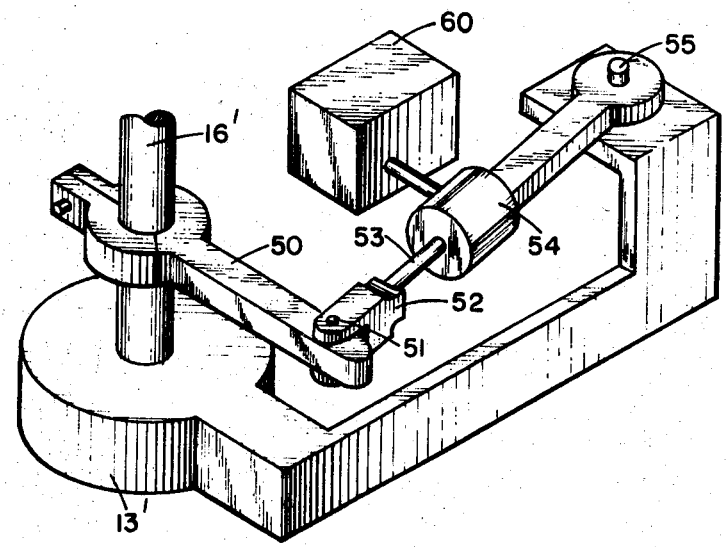

FIG. 4 schematically illustrates an apparatus for cyclically varying the torque on the pipe according to the invention; and

2

Figure 5:
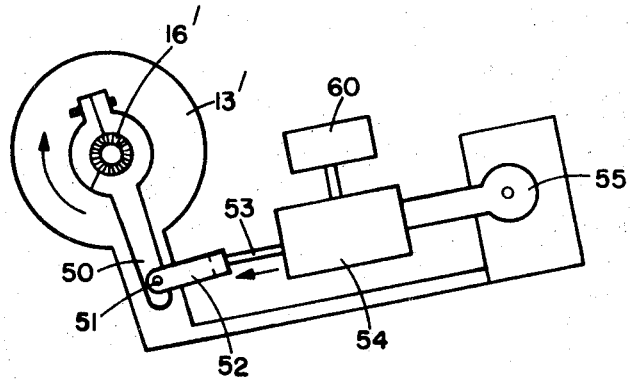

FIG. 5 is a top plan view of the apparatus of FIG. 4.

Figure 1:
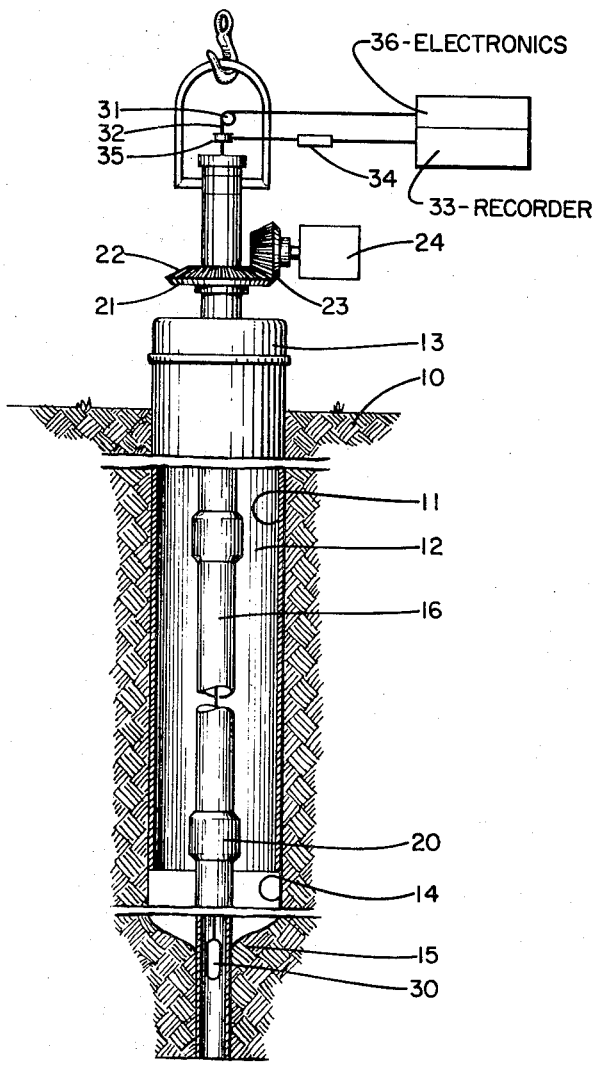
FIG. 1 illustrates a well bore containing a stuck pipe partially in side sectional elevation with certain parts broken away to show the arrangement thereof.

Referring now to the drawing in more detail, especially to FIG. 1, there is illustrated an earth formation 10 which has been drilled to receive a casing 11 in the well 12. The casing 11 is usually designated as a surface casing and serves as an anchor for the well head 13. The well is then drilled into the formation as at 14 and the well bore remains open during the drilling and completing of the well. The well bore is usually filled with a drilling fluid or mud which may be compounded with any desired specific gravity so that it will exert a greater hydrostatic pressure than the ambient pressure of the fluid in the formation such as at 15 which has been penetrated by the well bore. In this manner it is intended that the formation will not cave into the well bore and the formation fluids will not flow into the well bore because of the high specific gravity of the drilling fluid. Since wells drilled by the rotary method frequently are inclined or crooked, the drill pipe or other strings of pipe being lowered into the well bore or being removed therefrom will often become stuck in the well. Such a pipe is indicated generally at 16, but this pipe may be a drill stem, a string of casing, a tubing or any other string of pipe which is being positioned or manipulated in the well bore.

The pipe may become stuck due to various conditions, one of which is the composition of the drilling mud being circulated in the well bore. Sometimes the circulating equipment fails or for some reason circulation of the mud is discontinued and the more solid particles thereof settle in the well bore to become lodged about the pipe. In other instances the mud may have certain gelling qualities which cause it to become extremely viscous when circulation is discontinued. In still other instances the formations about the well bore cave in about the pipe and cause it to become lodged in the bore. In still other cases the lower section of the pipe has been cemented into the well bore and it is desired to retrieve the uncemented portion.

In any event if the pipe 16 becomes struck in the well bore and cannot be removed by extrting a pull thereon, it is desirable to ascertain the elevation at which the pipe is stuck. After such a determination, the pipe may then be unscrewed, cut off or worked upon to effect its release. For example, after it is determined that the pipe 16 is stuck at the point 15, the pipe collar 20 can be broken and the pipe above the collar removed. The stuck pipe can then be removed by salvaging or cutting operations well-known to those in the art.

Also illustrated in FIG. 1 is a torque-applying means having a gear-driven clamp mechanism 21 which is secured to the pipe 16 to implement the operation of applying torque to the pipe. The gear 22, being integrally mounted on the clamp 21, is meshed with the gear 23 which is driven by the motor-gearbox combination illustrated schematically by the box 24. The clamp 21 is secured to the pipe 16 by conventional means, for example, by welding or by bolting the clamp to the pipe.

A temperature logging instrument 30 is adapted to traverse the interior of the pipe 16, the instrument 30 being raised or lowered by a motor-driven rotation of a drum 31 about which the cable 32 is wound at the earth's surface. A logging recorder 33, for example, an x–y plotter, is driven through a transmission 34 by measuring reel 35 over which cable 32 is drawn so that the recorder moves in correlation with depth as the instrument 30 traverses the well along the interior of the pipe 16. The electrical signals from the instrument 30 are coupled through the cable 32 into the surface electronics section 36, the output of which provides a signal indicative of temperature to the input of the recorder 33.

Figure 2:
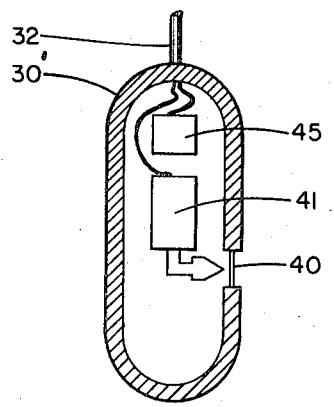
FIG. 2 is a schematic representation of a temperature logging tool adapted to be traversed through the stuck pipe illustrated in FIG. 1.

FIG. 2 illustrates one embodiment of the logging instrument 30 adapted to traverse the interior of the pipe 16. It is to be understood that the housing for the instrument 30 is constructed to withstand the pressures and mechanical and thermal abuses encountered in logging a deep well and provides adequate space within it to house the necessary temperature sensing apparatus and associated electrical circuits for conducting the steps of the present invention. A temperature sensitive transducer such as an electrical thermocouple 40, for example, constructed of copper and constantan or of platinum and platinum-rhodium, is mounted in the side of the instrument 30 for detecting changes in the temperature of the pipe. However, the thermocouple 40 may be of any conventional type known to those in the art and will be selected, in the practice of the invention, to suit the range of temperatures encountered in the well, as well as to achieve the desired sensitivity.

An electronics section 41, including an amplifier and the necessary cable driver accessories well-known to those in the logging art, is coupled to the output of the thermocouple 40. The output of the electronics section 41 is connected to the cable 32 for transmission to the earth's surface. A casing collar locator 45, for example, one like that described in either U.S. Pat. No. 2,558,427 to H. C. Fagon, issued June 26, 1951 or U.S. Pat. No. 2,967,994 to Glen Peterson, issued Jan. 10, 1961, to name but two, is also mounted in the instrument 30 to provide a means for locating the collar just above the point at which the pipe is stuck.

Figure 3:
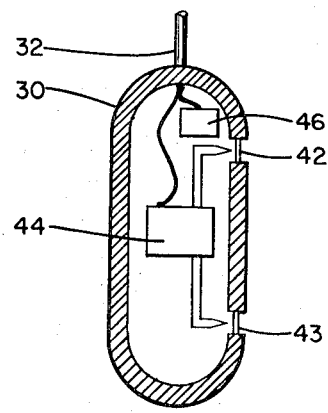
FIG. 3 is a schematic representation of an alternative embodiment of a temperature logging tool adapted to be traversed through the stuck pipe illustrated in FIG. 1.

FIG. 3 illustrates an alternative embodiment of the temperature logging instrument, represented generally by the reference numeral 30'. A pair of conventional thermocouples 42 and 43 are mounted in the instrument 30', thus providing means for making differential temperature measurement. The outputs of the thermocouples 42 and 43 are coupled into the electronics and cable driver circuitry 44. Since the circuitry in the electronics section 44 in FIG. 3 and the electronics section 41 in FIG. 2 is conventional and well-known to those in the art, such circuitry needs no elaborate illustration. Since the output of a thermocouple is a very small D.C. voltage, a D.C. amplifier, for example, serves quite well as circuit 41. On the other hand, a differential amplifier for the circuit 44 enables the difference between the outputs of thermocouples 42 and 43 to be amplified by a known amount and transmitted to the surface via cable 32. A casing collar locator 46, similar to the locator 45 of FIG. 2, is mounted in the instrument 30'.

The method of the present invention comprises the steps of causing temperature anomalies in the pipe and locating these anomalies as a means for locating the point or points which are stuck. To accomplish this it is preferred to first survey the pipe in its undisturbed condition and then, after mechanically inducing a temperature increase at various points by moving the pipe, again surveying the pipe whereby changes can be accurately recognized and located.

During the step of surveying the undisturbed pipe it should be recognized that valuable information about the condition of the pipe can be learned. For example, those points which are intimately in contact with thermally conductive material may exhibit a different temperature than other nearby points which are in contact with less conductive material. Especially this will be observed when fluids have recently been circulated through the pipe so as to cause the pipe temperature at various points along its length to be different from the equilibrium temperatures that would obtain after sufficient time elapsed. Accordingly in general the first operation will be to make a log of temperatures as a function of depth or a log of temperature differential as a function of depth. Any anomalies in these parameters may then be regarded as clues to the location of stuck points, and the logs may be employed as "base logs" to be compared with subsequent logs produced during the performance of the method herein disclosed.

In performing one method according to the present invention, the pipe clamp 21 is attached to the pipe 16 and torque is applied in a "right-hand" manner by the turning of the motor and gear box 24. It should be appreciated that the pipes are normally threaded together by "right-hand" torque; consequently, "left-hand" torque is carefully avoided to prevent some section of the pipes being unscrewed. While the torque is being applied to the pipe 16, or immediately thereafter, the logging instrument 30 is caused to traverse the interior of the pipe 16. If the sticking is due to a mechanical seizure, such as by a casing collapse, the thermocouple 40 illustrated in FIG. 2 detects the point of sticking since a temperature increase will be observed at this point if any movement at all can be produced at the stuck point. By way of example, a movement of .020 inch against a resisting frictional force, such as the jaws of a pipe wrench, of 36,000 pounds generates approximately twenty calories of heat. Twenty calories, when absorbed by fifty pounds of steel, raises the temperature about .01° C. By repeating the torque operation ten times, the temperature is raised about .1° C., easily detectable by the logging instrument 30. Since the recorder 33 provides an indication of temperature versus depth in the borehole, the "hot spot" detected while applying torque to the pipe is determinative of the stuck point of the pipe.

During the logging operation while using the instrument 30' illustrated in FIG. 3, the recorder 33 deviates from some reference potential to the amplified difference between the outputs of the two thermocouples opposite the "hot spot" and thermocouple 42 is above that point, a differential voltage will be produced and recorded by the recorder 33 as a function of the depth of the instrument 30' in the borehole. It should be appreciated that a differential type measurement as made by the instrument illustrated in FIG. 3 is less susceptible to temperature gradients non-associated with the torque operation than is the instrument illustrated in FIG. 2 having a single thermocouple.

Although single thermocouple and dual thermocouple instruments have been illustrated and described with regard to FIGS. 2 and 3, respectively, those skilled in the art will recognize that other types of temperature sensitive devices, for example, thermistors, may be used to determine either the absolute or differential temperatures encountered along the interior of the pipe caused by the application of torque or vertical force. Likewise, those skilled in the art will recognize that additional thermo-sensitive devices, for example, thermocouples, may be used in orientations selected for optimum sensitivity to determine the temperature anomalies created by applying torque to the stuck pipe.

Although the torque applied by the apparatus according to FIG. 1 provides a means for producing a localized hot spot in the pipe if the pipe has localized sticking, another type of distributed and frictional sticking, as in a key-seated drill pipe, may not produce localized temperature anomalies upon applying torque, especially where no movement of the stuck pipe can be attained at the stuck point. Nonetheless the point or points at which the pipe is stuck may be detected as hereinafter explained.

In the stuck pipe art, it is common practice to apply sufficient torque to produce one twist of revolution per 1000 feet of pipe. For a particular pipe that requires, for example, 9000 lb. feet of torque to produce that amount of rotation, the thermal dissipation depends upon the elasticity of the steel. If, for example, 10% of the total work done in winding up the pipe, like a torsion spring is wound up, is dissipated in the pipe due to internal friction, then each such twisting operation generates about two calories per foot of pipe. If the pipe weighs 20 pounds per foot, then the dissipated heat raises the steel temperature about .0025° C. By repeating the operation 100 times, enough energy is dissipated in the pipe to raise the temperature of the pipe about .25° C. along the entire length of the pipe above the stuck point, but not below. Thus the stuck point would be found to be the lowest point in the well at which a temperature increase was observed. However, for 10% of the applied power to be dissipated as internal heat, the steel would be stressed beyond prudent limits. Thus a continuous application of extreme torque is less desirable than repetitive application of a more modest torque, as by a cyclic means.

An apparatus for cyclically applying torque to a stuck drill pipe is illustrated in FIG. 4. This embodiment illustrates a means for alleviating the problem of applying too much stress to the stuck pipe while yet permitting the dissipation of the desired amount of heat in the pipe. The well head 13' is located at the surface of the earth similarly to well head 13 of FIG. 1, having a segment 16' of stuck drill pipe passing therethrough. A clamp member 50, being in two sections and bolted to the pipe, is connected at the pivot point 51 to a U-shaped member 52 which is connected by a rod 53 to the piston of a hydraulic cylinder 54. The cylinder 54 is pivoted at one end about the point 55 which is static with regard to the well head 13'.

The cylinder 54 is of the single-action type, i.e., it only applies a force in one direction. This direction is noted by the arrow drawn alongside the rod 53 in FIG. 5. Thus, the piston is caused to travel hydraulicly in the one direction to produce torque upon the pipe. At the end of the stroke, the torque is released and the elasticity of the pipe causes the piston to travel back in the opposite direction. Of course the cylinder and piston combination could be double-acting, i.e., could apply a force in both directions to create a rocking motion independent of the spring tension in the pipe, but this feature might cause the creation of the sometimes undesirable left-hand torque herein described.

The action of the hydraulic piston and cylinder 54 is controlled by the conventional hydraulic control equipment denoted generally by the numeral 60. It is to be understood that the equipment 60 has all of the necessary reservoirs, pumps and related equipment necessary to cause the piston to cyclically move in the direction indicated at any frequency desired. Thus, for example, the means illustrated allow the pipe to receive torque and to be relaxed at a relatively high frequency, perhaps 1000 times in a few minutes. Should a weak point exist in the pipe string that is on the verge of twisting off, such a point will in general dissipate a relatively larger amount of energy and can be found by the temperature anomaly created at the point of non-elastic distortion.

While the pipe cyclically receives torque and relaxation, the logging instrument 30, or alternatively 30', is caused to traverse the interior of the pipe 16'. Since all the pipe above the stuck point is heated, as explained above, the stuck point is indicated as being the point on a chart made by the recorder 33 at which there is a temperature change.

Referring further to FIG. 5, there is illustrated another view of the apparatus of FIG. 4. It should be appreciated that when the rod 53 moves in the direction of the arrow there alongside, the clamp 50 causes the pipe 16' to receive righthand torque in the direction of the arrow alongside the clamp. FIG. 5 also further illustrates how the cylinder 54 is pivoted about the points 51 and 55 to create rotational motion, from the movement of the piston in the cylinder 54.

Another method whereby temperature anomalies can be induced in stuck pipe includes the stretching of the pipe. This stretching operation can be performed when a drilling rig or similar source of hoisting power is available at the well. A rig is in general present since it may be presumed that drilling or work over operations will be in progress at times when it is desired to free stuck pipe.

In a manner analogous to that described in connection with the application of torque to the pipe, the rig may be employed to stretch the pipe with a force just less than that calculated to cause it to break. A temperature log, or a differential temperature log, may be run while the stretching operation is in progress or immediately thereafter. An increase in temperature will be observed whenever mechanical energy is dissipated in the pipe. This will occur wherever there is a nonelastic stretch of the pipe or whenever the pipe moves against friction caused by restraining solid elements, for example, rocks caved in around the pipe. Where no movement of the pipe occurs, no heat will be dissipated and there will be no temperature rise.

If no localized stuck point exists, then a single stretching operation will not produce appreciable heat unless the pipe is stretched beyond its elastic limit. Frequently such extreme stretching will be acceptable, and in fact advantageous. It will then be observed that the greatest temperature increase will occur at the weakest point in the pipe above the stuck point. However, only points above this stuck point will exhibit a temperature increase.

If it is deemed undesirable to stretch the pipe appreciably beyond its elastic limit, it is then desirable to employ a means for cyclically stretching the pipe so as to generate substantial heat throughout the free portion of the pipe. This may be done by repetitive vertical reciprocation analogous to the previously described rotary reciprocation.

Thus, in general, the procedure will be to first make a temperature survey of the pipe in its initial state. Then, by reciprocating, distorting, or forcing movement in the pipe, temperature anomalies are induced at the stuck point and/or at points above the stuck point. The next step includes the making of an additional survey or surveys while the pipe is being worked or immediately thereafter. By repeating or continuing the process of dissipating energy in the pipe, additional anomalies are located and the existence of those first observed is verified. Then by noting the nature and location of the anomalies with relation to those observed in other wells under similar circumstances, and in the light of the foregoing explanation, the location of the stuck point or stuck points can be determined.

Thus there has been illustrated and described herein means for either applying a constant or a cyclic torque or force to a stuck drill pipe and also means for detecting thermal anomalies resulting from the conversion of applied mechanical energy to heat in the stuck pipe at locations relating to the condition of the pipe and the place and manner of sticking. Since the logging instrument has a casing collar locator, the methods described herein can be used to also determine the collar immediately above the stuck point so that the pipe can be released at that collar. Although not illustrated, the logging instrument could also be equipped with a collar breaker or perforator, if desired, to loosen the pipe for removal above the collar.

While preferred embodiments of the methods according to the invention have been illustrated and described, many modifications thereof may be made by a person skilled in the art without departing from the spirit of the invention, and it is intended that all such modifications be included within the scope of the appended claims.

The embodiments of the invention in which an exclusive property or privilege is claimed are defined as follows:

1. A method for locating the stuck point of a pipe in a well comprising:
   applying torque in a cyclic manner to the pipe;

measuring the temperature anomalies in said pipe resulting from said application of torque; and recording said temperature measurements as a function of the depth in the well at which said measurements are made.

2. A method for locating the stuck point of a pipe in a well comprising:

applying torque to the pipe;

measuring the temperature anomalies in said pipe resulting from said application of said torque, said measuring step comprising detecting temperatures at pairs of points within the well to indicate differential temperatures; and recording said temperature measurements as a function of the depth in the well at which said measurements are made.

References Cited

UNITED STATES PATENTS 1,680,589   8/1928   Bock _____ 73—15.6
2,814,019  11/1957   Bender _____ 73—151 X JERRY W. MYRACLE, Primary Examiner U.S. Cl. X.R.

73—15.6